(12) United States Patent
Konishi

(10) Patent No.: US 9,781,326 B2
(45) Date of Patent: Oct. 3, 2017

(54) EXPOSURE CONTROL APPARATUS AND METHOD, STORAGE MEDIUM, AND IMAGE PICKUP APPARATUS

(71) Applicant: CANON KABUSHIKI KAISHA, Tokyo (JP)

(72) Inventor: Kazuki Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 14/445,943

(22) Filed: Jul. 29, 2014

(65) Prior Publication Data

US 2015/0036040 A1   Feb. 5, 2015

(30) Foreign Application Priority Data

Jul. 31, 2013   (JP) .................................. 2013-159384

(51) Int. Cl.
  *H04N 5/235* (2006.01)
  *H04N 5/225* (2006.01)
  *H04N 5/232* (2006.01)

(52) U.S. Cl.
  CPC ......... *H04N 5/2258* (2013.01); *H04N 5/2352* (2013.01); *H04N 5/23219* (2013.01)

(58) Field of Classification Search
  CPC .............................. H04N 5/235; H04N 5/2351
  USPC .................................................. 348/221.1
  See application file for complete search history.

(56) References Cited

U.S. PATENT DOCUMENTS

| | | | | |
|---|---|---|---|---|
| 4,969,005 A | * | 11/1990 | Tokunaga | G03B 7/091 356/221 |
| 8,144,214 B2 | * | 3/2012 | Yamashita | H04N 5/2351 348/229.1 |
| 8,643,738 B2 | * | 2/2014 | Shiratani | G06K 9/00228 348/222.1 |
| 2003/0071908 A1 | * | 4/2003 | Sannoh | H04N 5/23212 348/345 |
| 2013/0321687 A1 | * | 12/2013 | Negroponte | H04N 5/23293 348/333.11 |
| 2014/0063288 A1 | * | 3/2014 | Suh | H04N 5/2353 348/229.1 |

FOREIGN PATENT DOCUMENTS

| | | | |
|---|---|---|---|
| JP | 09-266549 A | | 10/1997 |
| JP | 2008244587 A | * | 10/2008 |
| JP | 2011-254339 A | | 12/2011 |

* cited by examiner

*Primary Examiner* — Anthony J Daniels
(74) *Attorney, Agent, or Firm* — Cowan, Liebowitz & Latman, P.C.

(57) ABSTRACT

An exposure control apparatus which is capable of making a backlight judgment with accuracy using image data on a main subject and image data on a photographer and controlling exposure according to the judgment result. First image data is generated according to a main subject image formed by light from the main subject via a first shooting optical system, and second image data is generated according to a photographer image formed by light from a photographer via a second shooting optical system. First luminance information is obtained based on the first image data, and second luminance information is obtained based on the second image data. According to the first luminance information and the second luminance information, whether or not the main subject is in backlight scene is judged, and based on a result of the judgment, exposure for the main subject is controlled.

5 Claims, 11 Drawing Sheets

FIG. 6

| 10 | 10 | 10 | 10 | 10 | 10 | 10 | 10 |
|----|----|----|----|----|----|----|----|
| 10 | 10 | 10 | 10 | 10 | 10 | 10 | 10 |
| 10 | 10 | 25 | 25 | 25 | 25 | 10 | 10 |
| 10 | 10 | 25 | 50 | 50 | 25 | 10 | 10 |
| 10 | 10 | 25 | 50 | 50 | 25 | 10 | 10 |
| 10 | 10 | 25 | 50 | 50 | 25 | 10 | 10 |
| 10 | 10 | 25 | 25 | 25 | 25 | 10 | 10 |
| 10 | 10 | 10 | 10 | 10 | 10 | 10 | 10 |

FIG. 7

| 0.3 | 0.3 | 0.3 | 0.3 | 0.3 | 0.3 | 0.3 | 0.3 |
|-----|-----|-----|-----|-----|-----|-----|-----|
| 0.3 | 0.3 | 0.6 | 0.6 | 0.6 | 0.6 | 0.3 | 0.3 |
| 0.3 | 0.3 | 0.6 | 1.0 | 1.0 | 0.6 | 0.3 | 0.3 |
| 0.3 | 0.3 | 0.6 | 1.0 | 1.0 | 0.6 | 0.3 | 0.3 |
| 0.3 | 0.3 | 0.6 | 1.0 | 1.0 | 0.6 | 0.3 | 0.3 |
| 0.3 | 0.3 | 0.6 | 1.0 | 1.0 | 0.6 | 0.3 | 0.3 |
| 0.3 | 0.3 | 0.6 | 0.6 | 0.6 | 0.6 | 0.3 | 0.3 |
| 0.3 | 0.3 | 0.3 | 0.3 | 0.3 | 0.3 | 0.3 | 0.3 |

FIG. 8

| 0.3 | 0.3 | 0.3 | 0.3 | 0.3 | 0.3 | 0.3 | 0.3 |
|-----|-----|-----|-----|-----|-----|-----|-----|
| 0.3 | 0.3 | 0.3 | 0.3 | 0.3 | 0.3 | 0.3 | 0.3 |
| 0.6 | 0.6 | 0.6 | 0.6 | 0.6 | 0.6 | 0.6 | 0.6 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |

EXPOSURE CONTROL APPARATUS AND METHOD, STORAGE MEDIUM, AND IMAGE PICKUP APPARATUS

BACKGROUND OF THE INVENTION

Field of the Invention

The present invention relates to an exposure control apparatus and method, a storage medium, and an image pickup apparatus, and in particular to an exposure control apparatus and method that controls exposure using an image signal output from an image pickup element, which photoelectrically converts a subject image, a storage medium, and an image pickup apparatus.

Description of the Related Art

In general, some image pickup apparatuses such as digital cameras control exposure with a so-called backlight judgment made. For example, some image pickup apparatuses detect an area of an intermediate luminance region between two luminance levels supplied from an external device, and an average luminance level in the intermediate luminance region, and detects a backlight state by judging a backlight level based on the area and the average luminance level (see Japanese Laid-Open Patent Publication (Kokai) No. H09-266549, for example).

Further, there are camera systems which, when providing image pickup control including exposure control, provide image pickup control appropriate to shooting scenes in conjunction with detection information on images taken by another camera. Here, when one's own camera and another camera are placed in an area where shooting is desired, image pickup is controlled with emphasis placed on one of the cameras which is able to stably obtain detection information such as brightness and color temperature of shooting scenes (see Japanese Laid-Open Patent Publication (Kokai) No. 2011-254339, for example).

In the image pickup apparatus described in Japanese Laid-Open Patent Publication (Kokai) No. H09-266549, it is difficult to reliably detect a backlight state because a distinction is made between a subject region and a background region according to luminances between two levels supplied from an external device. This is because when the two levels supplied from the external device are not appropriate values due to a reflectivity of a subject, a color of a background, and so on, the subject region cannot be properly set.

Further, according to Japanese Laid-Open Patent Publication (Kokai) No. 2011-254339, when one's own camera and another camera are placed in an area where shooting is desired, image pickup is controlled with emphasis placed on detection information from the camera with higher stability, but because the plurality of cameras makes observations in the same direction, their detection information is likely to have equal stability. Thus, for example, in the case of making a backlight judgment, judgment accuracy does not greatly differ according to whether the judgment is made based on detection information from only one of the cameras or based on detection information from both of the cameras.

SUMMARY OF THE INVENTION

The present invention provides an exposure control apparatus and method, which is capable of making a backlight judgment with accuracy using image data on a main subject and image data on a user and controlling exposure according to the judgment result, a storage medium, and an image pickup apparatus.

In an aspect of the invention, there is provided an exposure control apparatus of an image pickup apparatus having a first image pickup unit configured to generate first image data according to a main subject image formed by light from a main subject via a first shooting optical system, and a second image pickup configured to generate second image data according to a user image formed by light from a user via a second shooting optical system, comprising: a first photometric measurement unit configured to obtain first luminance information based on the first image data; a second photometric measurement unit configured to obtain second luminance information based on the second image data; a judgment unit configured to judge, according to the first luminance information and the second luminance information, whether or not the main subject is in backlight scene; and an exposure control unit configured to control, based on a result of the judgment by the judgment unit, exposure for the main subject.

According to the present invention, it is possible to make a backlight judgment with accuracy using image data on a main subject and image data on a user, and control exposure according to the judgment result.

Further features of the present invention will become apparent from the following description of exemplary embodiments with reference to the attached drawings.

BRIEF DESCRIPTION OF THE DRAWINGS

FIG. 6 is a view showing exemplary weighting coefficients Wij determined in advance and for use in setting a weighting coefficient WEIGHTij in step S505 in FIG. 5.

FIG. 7 is a view showing exemplary predetermined correction coefficients H1ij for use in setting the weighting coefficient WEIGHTij in the step S505 in FIG. 5.

FIG. 8 is a view showing exemplary second correction coefficients for use in setting a second weighting coefficient in step S510 in FIG. 5.

DESCRIPTION OF THE EMBODIMENTS

The present invention will now be described with reference to the drawings showing embodiments thereof.

Figure 1:
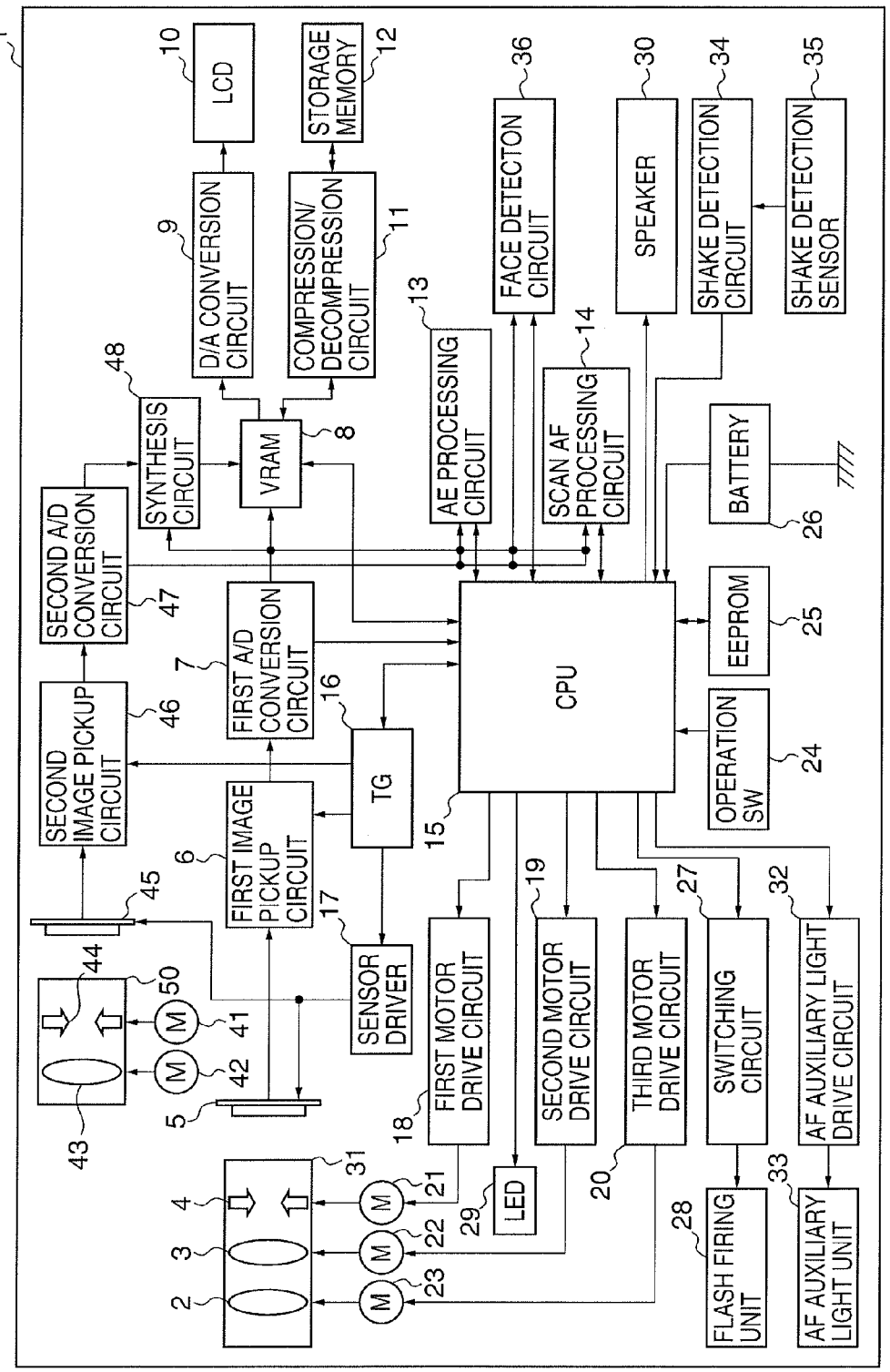
FIG. 1 is a block diagram showing an image pickup apparatus having an exposure control apparatus according to a first embodiment of the present invention.

FIG. 1 is a block diagram showing an image pickup apparatus having an exposure control apparatus according to a first embodiment of the present invention.

Referring to FIG. 1, a digital camera 1 (hereafter referred to merely as "the camera") as an image pickup apparatus has a first shooting lens barrel 31 which is a first shooting optical system. The first shooting lens barrel 31 has a zoom lens group 2, a focus lens group 3, and a diaphragm 4. The diaphragm 4 adjusts the amount of light passing through the zoom lens group 2 and the focus lens group 3. It should be noted that an object to be shot by the first shooting lens barrel 31 is a main subject.

A first solid-state image pickup device (hereafter rarefied to "the first sensor") 5 is disposed in a stage subsequent to the first shooting lens barrel 31. An optical image (a main subject image or a subject image) passing through the first shooting lens barrel 31 forms an image on the first sensor 5, which in turn performs photoelectric conversion to output an electric signal (hereafter referred to as "the first analog signal") corresponding to the optical image.

The first analog signal is supplied to a first image pickup circuit 6, which in turn carries out various types of image processing on the first analog signal to obtain a first image signal (analog image signal). The first image signal is converted into a first digital image signal (first image data) through A/D conversion by a first A/D conversion circuit 7.

On the other hand, the camera 1 shown in the figure has a second shooting lens barrel 50 which is a second shooting optical system. The second taking lens barrel 50 has a focus lens group 43 and a diaphragm 44, which adjusts the amount of light passing through the focus lens group 43. It should be noted that an object to be shot by the second shooting lens barrel 50 is a photographer (user).

A second solid-state image pickup device (hereafter rarefied to "the second sensor") 45 is disposed in a stage subsequent to the second shooting lens barrel 50. An optical image (a user image) passing through the second shooting lens barrel 50 forms an image on the second sensor 45, which in turn performs photoelectric conversion to output an electric signal (hereafter referred to as "the second analog signal") corresponding to the optical image.

The second analog signal is supplied to a second image pickup circuit 46, which in turn carries out various types of image processing on the second analog signal to obtain a second image signal (analog image signal). The second image signal is converted into a second digital image signal (second image data) through A/D conversion by a second A/D conversion circuit 47.

The first and second image data are supplied to a synthesis circuit 48, which in turn carries out a synthesis process on the first and second image data to obtain composite image data. The composite image data is then temporarily recorded in a memory (VRAM) 8.

It should be noted that the first image data described above is temporarily recorded in the VRAM 8 by the first A/D conversion circuit 7.

A D/A conversion circuit 9 reads out image data recorded in the VRAM 8, converts the image data into an analog signal, and further converts the analog signal into a display image signal, which is a signal suitable for reproduced output. The display image signal is displayed as an image on a liquid crystal display (LCD) 10.

A compression/decompression circuit 11 reads out image data recorded in the VRAM 8 and carries out a compression process and an encoding process on the image data to obtain encoded image data. The compression/decompression circuit 11 then stores the encoded image data in storage memory 12 such as semiconductor memory.

The compression/decompression circuit 11 also reads out encoded image data stored in the storage memory 12 and carries out a coding process and a decompression process on the image data to obtain image data. The compression/decompression circuit 11 then stores the image data in VRAM.

An automatic exposure (AE) processing circuit 13 receives first and second image data and carries out AE processing according to the first and second image data. For example, the AE processing circuit 13 receives at least one of the first and second image data, and performs, for the received image data, calculations such as cumulative additions on luminance values of a one-screen image. The AE processing circuit 13 then obtains an AE evaluation value (that is, first brightness information and second brightness information) according to a brightness of a subject or a user and sends the AE evaluation value to a CPU 15.

Specifically, the AE processing circuit 13 divides an image represented by image data (for one screen) into a plurality of blocks. The AE processing circuit 13 weights each of these blocks according to a difference between its position and a block which is a reference (a reference block) and then sums brightness values. It should be noted that the method of division by the AE processing circuit 13 differs from each other between a case where a face region is detected by a face detection circuit 36, to be described later, and a case where no face region is detected by the face detection circuit 36.

In the above described way, the AE processing circuit 13 obtains an AE evaluation value which is an exposure value corresponding to a brightness value subjected to the weighted summation. Further, under the control of the CPU 15, the AE processing circuit 13 judges whether or not to fire a flash 28 for first image data according to a difference between a luminance value of the reference block and a luminance value subjected to the weighted summation.

A scan autofocus (AF) processing circuit 14 receives first and second image data, and generates an AF evaluation value for carrying out AF processing based on the first and second image data. For example, the scan AF processing circuit 14 receives at least one of first and second image data and carries out a high pass filter (HPF) process on the received image data to extract high-frequency components thereof. The scan AF processing circuit 14 then performs a computation process such as cumulative summation on the high-frequency components to obtain an AF evaluation value such as a high frequency side contour amount or the like. It should be noted that an AF evaluation value should not necessarily be generated using the method described above, but may be generated by, for example, detecting a phase difference.

To the CPU 15 are connected an operation switch (SW) 24 which is comprised of various switches, and a dedicated memory (EEPROM) 25. The EEPROM 25 is an electrically erasable programmable read-only memory, and programs for providing various types of control, data for use in carrying out various operations, and so on are stored in advance in the EEPROM 25.

A timing generator (TG) 16 outputs a predetermined signal to the CPU 15, the first image pickup circuit 6, a sensor driver 17, and the second image pickup circuit 46. In synchronization with the timing signal, the CPU 15 controls the entire camera 1. The sensor driver 17 drives the first and second sensors 5 and 45 in synchronization with the timing signal. The first image pickup circuits 6 and 46 carries out various types of image processing such as separation of color signals in synchronization with the timing signal.

A first motor drive circuit 18 drivingly controls a first diaphragm drive motor 21 under the control of the CPU 15 to adjust an aperture of the diaphragm 4. A second motor drive circuit 19 drivingly controls a first focus drive motor 21 under the control of the CPU 15 to move the focus lens group 3 along an optical axis. A third motor drive circuit 20 drivingly controls a zoom drive motor 23 under the control of the CPU 15 to move the zoom lens group 2 along the optical axis.

Namely, based on an AF evaluation value obtained according to an output from the first sensor 5, the CPU 15 controls the first motor drive circuit 18 to drive the diaphragm drive motor 21. As a result, the CPU 15 appropriately adjusts an aperture value of the diaphragm 4 (AE control). Further, based on an AF evaluation value obtained according to an output from the first sensor 5, the CPU 15 controls the second motor drive circuit 19 to drive the focus drive motor 22. As a result, the CPU 15 moves the focus lens group 3 to a focusing position (AF control).

Likewise, based on an AE evaluation value and an AF evaluation value obtained according to an output from the second sensor 45, the CPU 15 causes a motor drive circuit (not shown) to control a diaphragm drive motor 41 and a focus drive motor 42, thus driving the diaphragm 44 and the focus lens group 43. It should be noted that no signal line for control is shown in FIG. 1.

When a user operates a zoom switch disposed in the operation switch 24, the CPU 15 controls the third motor drive circuit 20 to drivingly control the zoom drive motor 23. As a result, the CPU 15 moves the zoom lens group 2 along the optical axis to change magnifications (zooming).

Further, to the CPU 15 are connected a battery 26 and a switching circuit 27. The switching circuit 27 controls firing of a flash firing unit 28 under the control of the CPU 15. To the CPU 15 is also connected an AF auxiliary light drive circuit 32, and the AF auxiliary light drive circuit 32 drives an AF auxiliary light unit 33 under the control of the CPU 15. The AF auxiliary light unit 33 is comprised of, for example, an LED, and the CPU 15 fires the AF auxiliary light unit 33 so as to illuminate all or part of a subject when obtaining an AE evaluation value.

To the CPU 15A are also connected a display device (LED), which displays a warning or the like, and a speaker 30. The CPU 15 causes the speaker 30 to provide guidance, warning, or the like, by voice.

A vibration detection sensor 35 detects a vibration such as camera shake and supplies a camera shake detection signal to a vibration detection circuit 34. The vibration detection circuit 34 processes and supplies the camera shake detection signal to the CPU 15.

A face detection circuit 36 receives a first and a second image data, detects face positions, face sizes of a subject and a user in the first and the second image data, respectively, and sends a face detection signal to the CPU 15. For example, the face detection circuit 36 receives at least one of the first and the second image data, searches for parts characterizing a face such as eyes and eyebrows, and determines a position of a human face in an image. Further, the face detection circuit 36 obtains a size, inclination, and so on of the face according to positional relationships such as spaces between the parts characterizing the face.

A semiconductor memory such as a flash memory, or a semiconductor memory such as a card-type flash memory, which is molded in a card or stick shape and removable from a camera, is used as the storage memory 12 described above. Further, for example, a magnetic recording medium such as a hard disk or a flexible disk may be used as the storage memory 12.

Further, the operation switch 24 includes therein a main power switch for starting the camera 1, a release switch for starting a shooting operation (storing operation), a reproducing switch for starting a reproducing operation, a zoom switch for zooming using the zoom lens group 2, and so on.

With a first stroke (hereafter referred to as "the SW1"), the release switch generates a first instruction signal for starting AE processing performed before a shooting operation. With a second stroke (hereafter referred to as "the SW2"), the release switch generates a second instruction signal for starting an exposure operation.

As described above, first image data and composite image data are temporarily recorded in the VRAM 8. For this reason, an image corresponding to first image data (that is, an image concerned with subject) is displayed on the LCD 10 (display unit), or an image corresponding to composite image data (that is, an image concerned with a subject and a user) is displayed on the LCD 10. In other words, an image corresponding to first image data and an image corresponding to composite image data are selectively displayed on the LCD 10.

Likewise, an image concerned with a subject is stored in the storage memory 12, or an image concerned with a subject and a user is stored in the storage memory 12.

Figure 2:
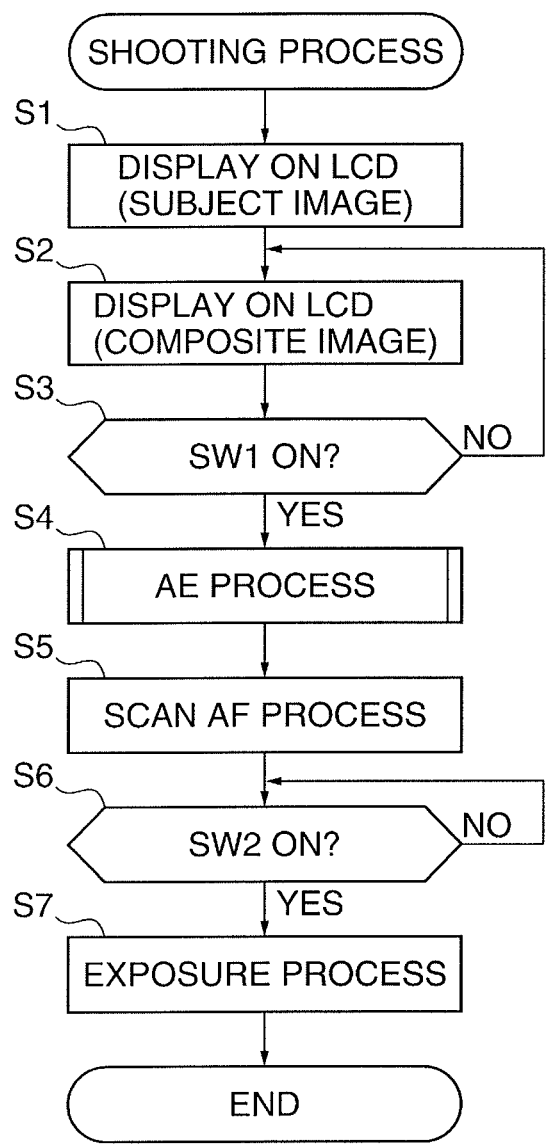
FIG. 2 is a flowchart showing the procedure of a shooting process that is performed by a camera 1 of FIG. 1.

FIG. 2 is a flowchart showing the procedure of a shooting process carried out by the camera 1 of FIG. 1.

The process of FIG. 2 is carried out by the CPU 15.

In the following description, an operation in which an AF evaluation value is obtained while the focus lens group 3 is being moved to a predetermined position is referred to as "the scanning", and a space between focus lenses when obtaining an AF evaluation value is referred to as "the scanning space".

Further, a position of a focus lens that obtains an AF evaluation value is referred to as "the scanning point", the number of AF evaluation values is referred to as "the number of scanning points", a range where an AF evaluation values are obtained is referred to as a "scanning range", and a region where an image signal is obtained when a focusing position is detected is referred to as an "the AF frame".

Referring to FIG. 2, when a user turns on the main power switch, and an operation mode is a shooting (recording) mode, the CPU 15 displays, on the LCD 10, an image corresponding to a subject image formed on the first sensor 5 after passing through the first taking lens barrel 31 (step S1). Namely, as described above, a subject image formed on the first sensor 5 is converted into a first analog signal by a photoelectric conversion process. The first analog signal is subjected to signal processing by the first image pickup circuit 6, then converted into first image data by the first A/D conversion circuit 7, and temporarily stored in the VRAM 8. The first image data stored in the VRAM 8 is output as a display image signal to the LCD 10 by the D/A conversion circuit 9, causing an image to be displayed on the LCD 10.

The CPU 15 then causes the synthesis circuit 48 to synthesize second image data, which is obtained according to a subject image formed on the second sensor 45 after passing through the taking lens barrel 50, and the first image data with each other to obtain composite image data and records the composite image data in the VRAM 8. The CPU 15 sends the composite image data from the VRAM 8 to the D/A conversion circuit 9 and displays, on the LCD 10, an image (composite image) corresponding to the composite image data as a display image signal (step S2).

Here, the synthesis circuit 48 reduces an image concerned with the second image data and superimposes this image on an image associated with the first image data. As a result, for example, in an upper right-hand part of a screen of the LCD 10, the image associated with the second image is displayed in a superimposed manner.

The CPU 15 then determines whether or not the SW1 has been turned on (step S3). When the SW has not been turned on, that is, the SW is off (NO to step S3), the process returns to the step S2, in which the CPU 15 performs an image update by displaying the image corresponding to the composite image data. On the other hand, when the SW has been turned on, the CPU 15 carries out an AE process in FIG. 3, to be described later (step S4).

In the AE process in the step S4, for example, exposure in a backlit scene is controlled, or an error in exposure calculation resulting from the sky is corrected for. Here, the CPU 15 divides an image (that is, a screen) into a plurality of areas and obtains average luminances Yij in the respective areas. Further, the CPU 15 obtains a luminance Yc in a central area which is a main subject region. Then, based on weighting coefficients Wij and correction coefficients Hij in the respective areas, the CPU 15 obtains weights WEIGHTij in the respective areas appropriate for shooting scenes.

The CPU 15 then obtains a luminance value Yupper in an upper part of the screen and a luminance value Yunder in a lower part of the screen, and when the luminance value Yupper is a predetermined number of times as large as the luminance value Yunder, the CPU 15 further corrects the weights WEIGHTij in the respective areas appropriate for the shooting scenes. The CPU 15 further obtains an exposure control correction value Delta according to the average luminances Yij and the weights WEIGHTij in the respective areas. Further, in the AE process, the CPU 15 further determines an aperture value Av, a shutter speed Tv, and a sensor sensitivity value Sv for main exposure according to an exposure value for use in obtaining an image and the exposure control correction value Delta.

In the present embodiment, to control exposure in a backlit scene, or correct for an error in exposure calculation resulting from the sky, there is used an image of a user obtained from the second shooting lens barrel 50 aimed at the user in shooting as will be described later.

The CPU 15 then carries out a scan AF process for obtaining focusing positions of focus lens groups according to AF evaluation values (step S5). At the time of carrying out the scan AF process, the CPU 15 obtains positions of the focus lens groups 3 and 43 at which there are the most high-frequency components according to the first and the second image data, and drivingly controls the focus lens groups 3 and 4 to the positions.

Namely, the CPU 15 drivingly controls the focus lens groups 3 and 43 from positions corresponding to infinity to positions corresponding to close range set in a shooting mode. The CPU 15 obtains AF evaluation values from the scan AF processing circuit while drivingly controlling the focus lens groups 3 and 43. When the driving of the focus lens groups 3 and 43 is completed, the CPU 15 detects a maximum AF evaluation value among the AF evaluation values with respect to each of the focus lens groups 3 and 43 and obtains positions of the focus lens groups 3 and 43 corresponding to the maximum AF evaluation values. The CPU 15 then moves the focus lens groups 3 and 43 to the positions where the AF evaluation values are greatest.

When the SW2 is turned on (YES to the step S6), the CPU 15 then carries out an exposure process, that is, shooting (step S7), followed by the program terminating.

Figure 3:
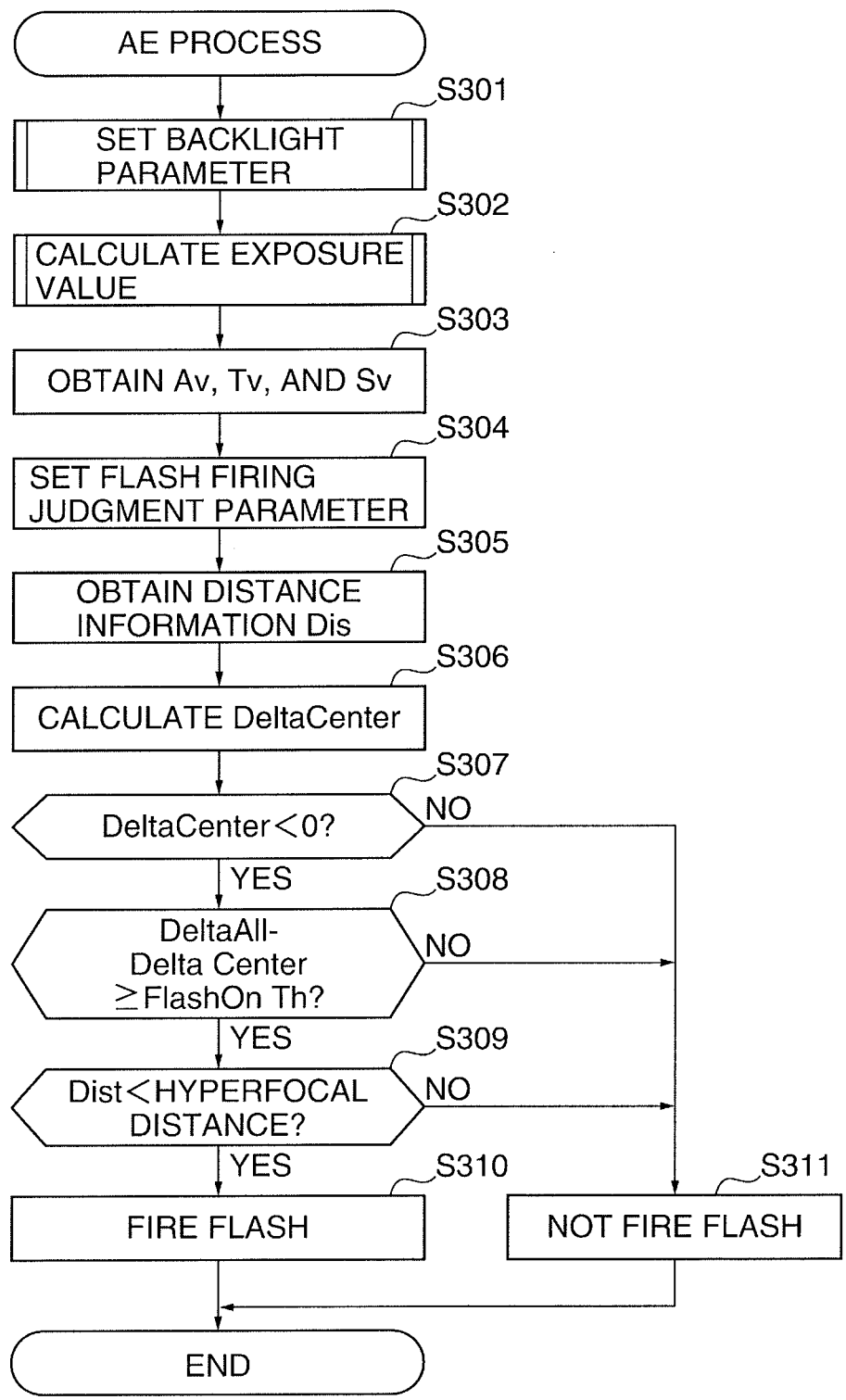
FIG. 3 is a flowchart showing the procedure of an AE process that is performed in step S4 in FIG. 2.

FIG. 3 is a flowchart showing the procedure of the AE process that is performed in the step S4 in FIG. 2.

Referring to FIG. 3, first, the CPU 15 performs a backlight parameter setting process in FIG. 4, to be described later, and sets weighting parameters (also referred to as "the backlight parameters") for an area surrounding a central area for use in making a backlight judgment (step S301).

Figure 4:
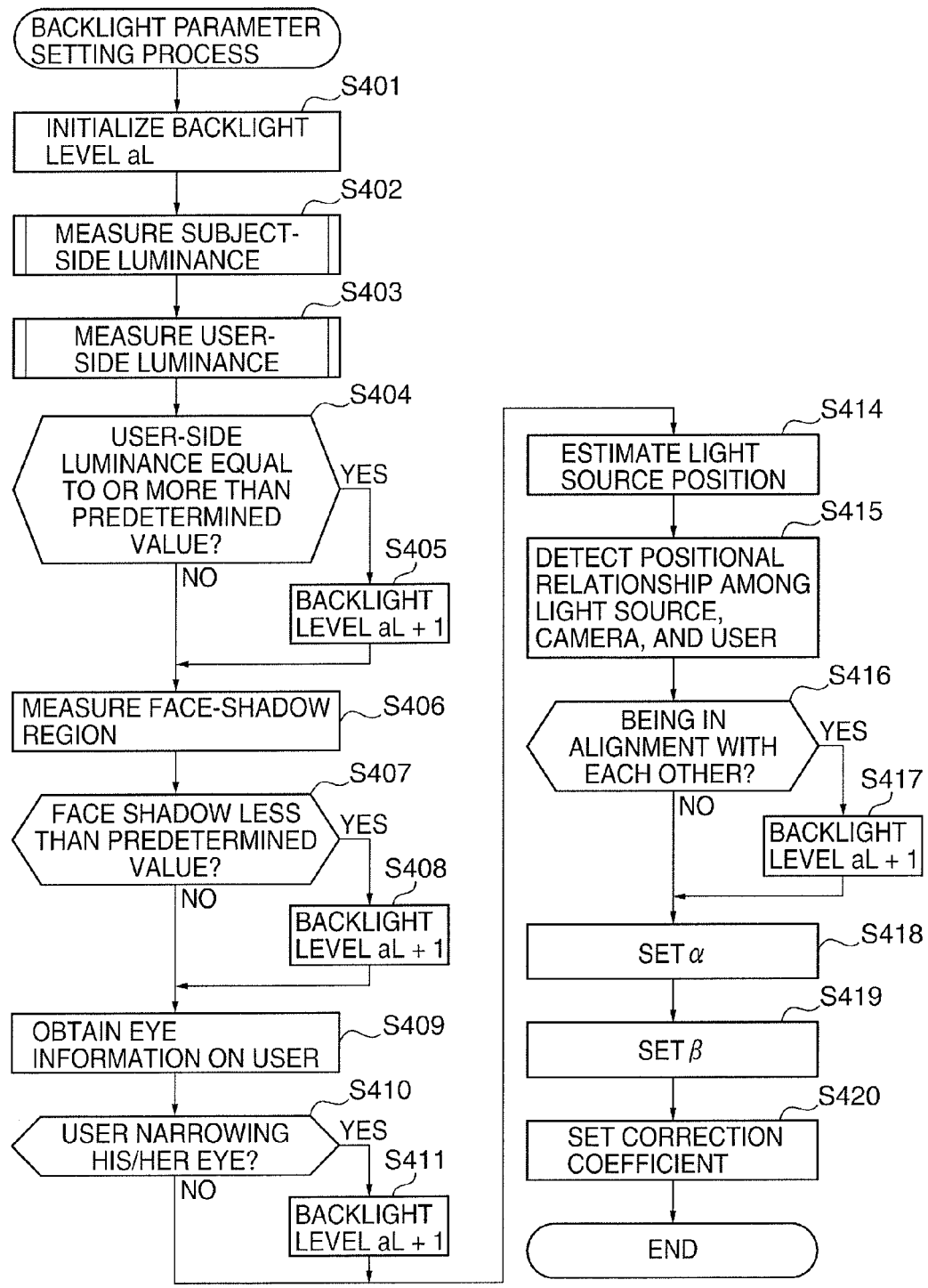
FIG. 4 is a flowchart showing the procedure of a backlight parameter setting process that is performed in step S301 in FIG. 3.

FIG. 4 is a flowchart showing the procedure of the backlight parameter setting process that is performed in the step S301 in FIG. 3.

When the CPU 15 starts setting the backlight parameter, first, it initializes a parameter (backlight level aL) indicating the degree of backlight to zero (step S401).

The CPU 15 then carries out a subject luminance measurement process of FIG. 5, to be described later, to obtain a subject-side luminance based on an aperture value of the diaphragm 4 disposed in the first shooting lens barrel 31, integration time of the first sensor 5, degree of signal amplification associated with signal processing performed by the first image pickup circuit 6, and an AE evaluation value (step S402) (subject-side luminance measurement).

Figure 5:
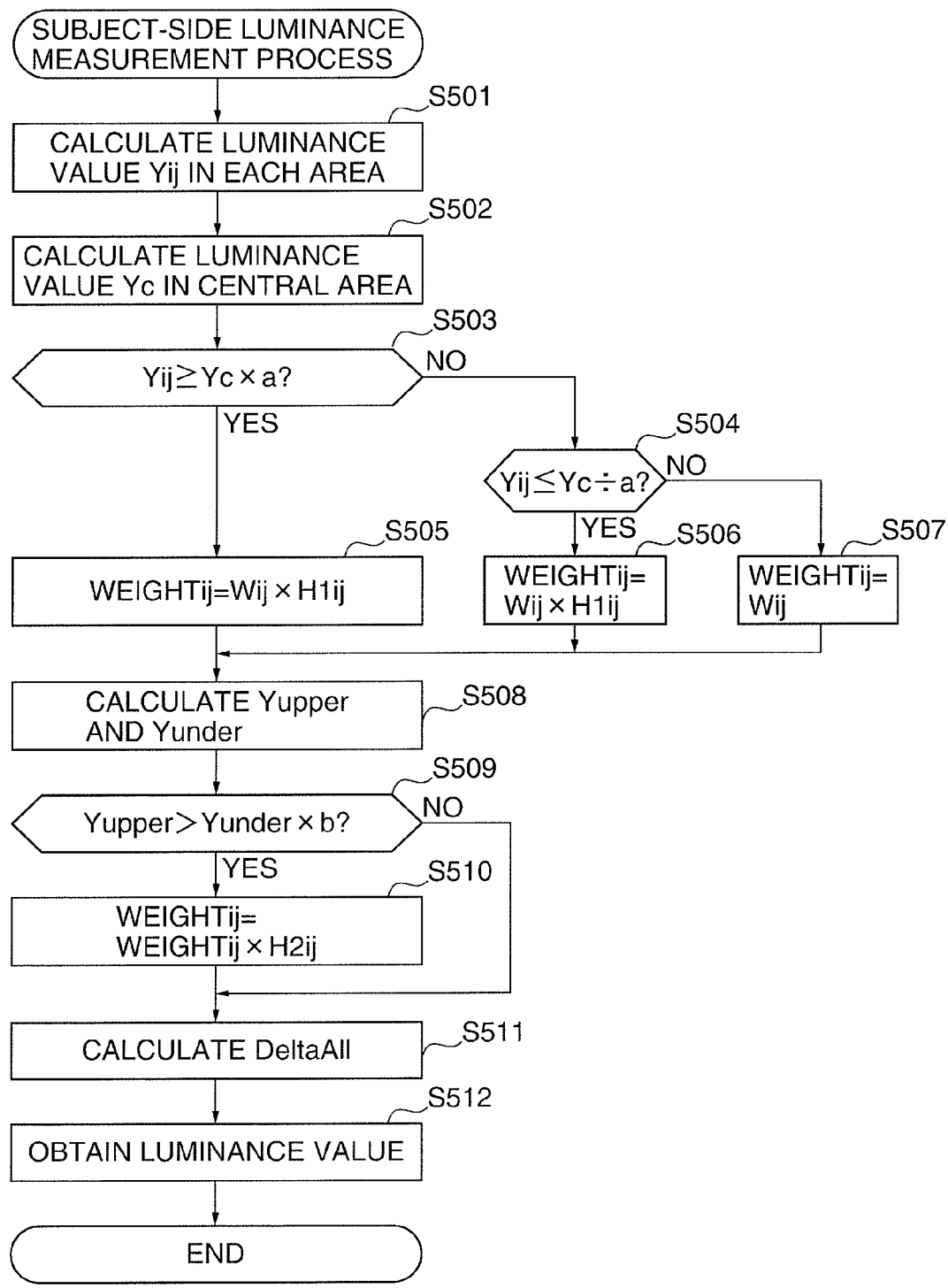
FIG. 5 is a flowchart showing the procedure of a subject-side luminance measurement process that is performed in step S402 in FIG. 4.

FIG. 5 is a flowchart showing the procedure of the subject-side luminance measurement process that is performed in the step S402 in FIG. 4.

It is assumed here that an image (that is, a screen) is divided into 8 areas for each of upper, lower, right, and left parts, that is, 64 areas in total.

Referring to FIG. 5, first, the CPU 15 obtains an average luminance value Yij (i=0 to 7, j=0 to 7) in each area (step S501). Further, the CPU 15 obtains a luminance value Yc in a central part of the image using an equation (1) (step S502).

$$Y_c = (Y_{33} + Y_{34} + Y_{43} + Y_{44})/4 \quad (1)$$

The CPU 15 then judges whether or not the luminance value in each area is $\underline{a}$ times as large as the luminance value in the central area. Namely, the CPU 15 determines whether or not Yij≥Yc×a (step S503). Here, $\underline{a}$ is set at a value of about 2 to 4. When Yij<Yc×a (NO to step S503), the CPU 15 judges whether or not the luminance value in each area is 1/a times as small as the luminance value in the central area. Namely, the CPU 15 determines whether or not Yij≤Yc/a (step S503).

When Yij≥Yc×a holds (YES to step S503), the CPU 15 multiplies a weighting coefficient Wif (FIG. 6), which is determined in advance, by a predetermined correction coefficient H1ij (FIG. 7) (first correction coefficient) to obtain a weighting coefficient WEIGHTij (first weighting coefficient) for use in obtaining an exposure control correction value. Namely, the CPU 15 determines that WEIGHTij=Wij×H1ij (step S505).

When Yij≤Yc/a holds (YES to step S504), the CPU 15 determines that WEIGHTij=Wij×H1ij (step S506). On the other hand, when Yij>Yc/a holds (NO to step S504), the CPU 15 sets the weighting coefficient WEIGHTij at the weighting coefficient Wij (step S507).

FIG. 6 is a view showing exemplary weighting coefficients wij determined in advance and for use in setting the weighting coefficient WEIGHTij in the step S505 in FIG. 5.

Referring to FIG. 6, the weighting coefficient Wij is determined in advance with respect to each area of an image. In the example shown in the figure, the weighting coefficient Wij is high in a central area of the image and decreases toward a surrounding area.

FIG. 7 is a view showing exemplary predetermined correction coefficients H1ij for use in setting the weighting coefficient WEIGHTij in the step S505 in FIG. 5.

Referring to FIG. 7, the correction coefficient H1ij is determined in advance with respect to each area of an image. In the example shown in the figure, the correction coefficient H1ij is high in a central area of the image and decreases toward a surrounding area.

Referring to FIG. 5 again, after carrying out the processes in the steps S505, S506, or S507, the CPU 15 calculates an average luminance value Yupper in an upper part of the image and an average luminance value Yunder in a lower part of the image using an equation (2) and an equation (3), respectively (step S508).

$$Y\text{upper}=(Y_{00}+Y_{01}+Y_{02}+Y_{03}+Y_{04}+Y_{05}+Y_{06}+Y_{07})/4 \quad (2)$$

$$Y\text{under}=(Y_{70}+Y_{71}+Y_{72}+Y_{73}+Y_{74}+Y_{75}+Y_{76}+Y_{77}+Y_{77})/4 \quad (3)$$

The CPU 15 then determines whether or not the average luminance value Yupper is greater than a value which is $\underline{b}$ times as large as the average luminance value Yunder, that is, whether or not Yupper>Yunder×b holds (step S509). When Yupper>Yunder×b holds (YES to step S509), the CPU 15 multiplies the weighting coefficient WEIGHTij by a predetermined correction coefficient H2ij (second correction coefficient) to correct the weighting coefficient WEIGHTij and obtain a second weighting coefficient (step S510). It should be noted that the coefficient $\underline{b}$ is set at a value from 2 to 4.

FIG. 8 is a view showing exemplary second correction coefficients for use in setting the second weighting coefficient in the step S510 in FIG. 5.

Referring to FIG. 8, the second correction coefficient (correction coefficient H2ij) is high in the lower part of the image and takes on a value "1.0" from the lower part to a central part. The second correction coefficient decreases toward an upper part of the image and takes on values "0.6" and "0.3".

Referring to FIG. 5 again, the CPU 15 calculates an exposure control correction value DeltaAll using an equation (4) below (step S511).

$$\text{DeltaAll}=\text{Log }2(\Sigma(Yij\times\text{WEIGHT}ij)/(\Sigma\text{WEIGHT}ij)/Y\text{ref} \quad (4)$$

where Yref is a target luminance of an image.

In the equation (4), both the first weighting coefficient and the second weighting coefficient are represented by WEIGHTij.

Thereafter, the CPU 15 calculates a subject luminance according to the exposure control correction value DeltaAll, an aperture value when an image used to find the exposure control correction value DeltaAll is generated, integration time of the first sensor, and degree of signal amplification performed by the first image pickup circuit (step S512), followed by the program terminating.

When Yupper≤Yunder×b holds (NO to step S509), the program proceeds to the step S511, in which the CPU 15 obtains the exposure control correction value DeltaAll according to the above equation (4), that is, using the first weighting coefficient without correcting the weighting coefficient WEIGHTij, followed by the CPU 15 carrying out the processes in the step S512 et seq.

By carrying out a subject-side luminance measurement in the above described manner, a luminance of a subject can be measured without being affected by a luminance of a background with emphasis placed on a central part.

Referring to FIG. 4 again, the CPU 15 carries out a user-side luminance measurement process of FIG. 10, to be described later, to obtain a user-side luminance based on an aperture value of the diaphragm 44, an integration time of the second sensor 45, and the degree of signal amplification in signal processing performed by the second image pickup circuit 46, and an AE evaluation value obtained by the AE processing circuit 13 (step S403).

The process in the step S403 is similar to the process in the step S402, but here, the user is an object to be measured, and hence face detection is possible except in special cases where illumination intensity is extremely low or a face is covered with a mask or the like. Thus, in the process in the step S403, a user-side luminance is obtained with emphasis placed on an area where there is a face region in an image, not a central part of the image. It should be noted that face detection is unsuccessful, the same procedure as that in the step S401 is followed.

A description will now be given of the process in the step S403. In the following description, it is assumed that a face of a user is detected.

Figure 9:
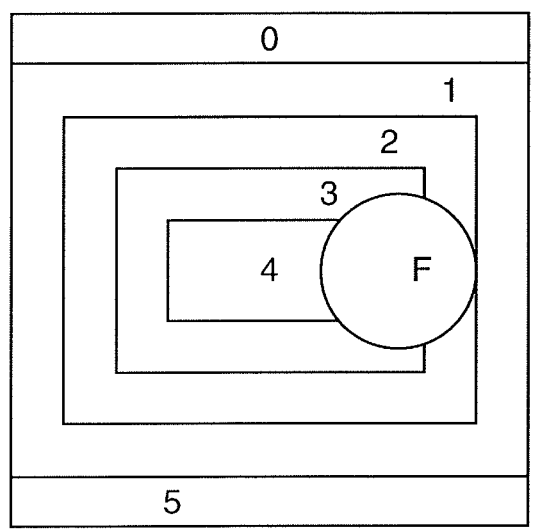
FIG. 9 is a view showing how an image is divided when a user-side luminance is measured in step S403 in FIG. 4.

FIG. 9 is a view showing how an image is divided at the time of the user-side luminance measurement in the step S403 in FIG. 4.

Here, the CPU 15 divides an image, which is obtained by shooting a user as a subject, into seven areas. The CPU 15 sets an area where a face region is detected as an area "F", and sets areas "0" to "5" separately from the area "F". For example, the CPU 15 divides the image into eight regions in a horizontal direction, divides the image into ten regions in a vertical direction, and sets a part where there are eight regions in the horizontal direction and one region in the vertical direction in an uppermost part of the image as an area "0".

Likewise, the CPU 15 sets a part where there are eight regions in the horizontal direction and one region in the vertical direction in a lowermost part of the image as an area "5". For the remaining part, the CPU 15 sets an outermost peripheral part as an area "1", sets a part inside the area "1" as an area "2", sets a part inside the area "2" as an area "3", sets a central part as an area "4". However, a part that overlaps a face area "F" is excluded.

Figure 10:
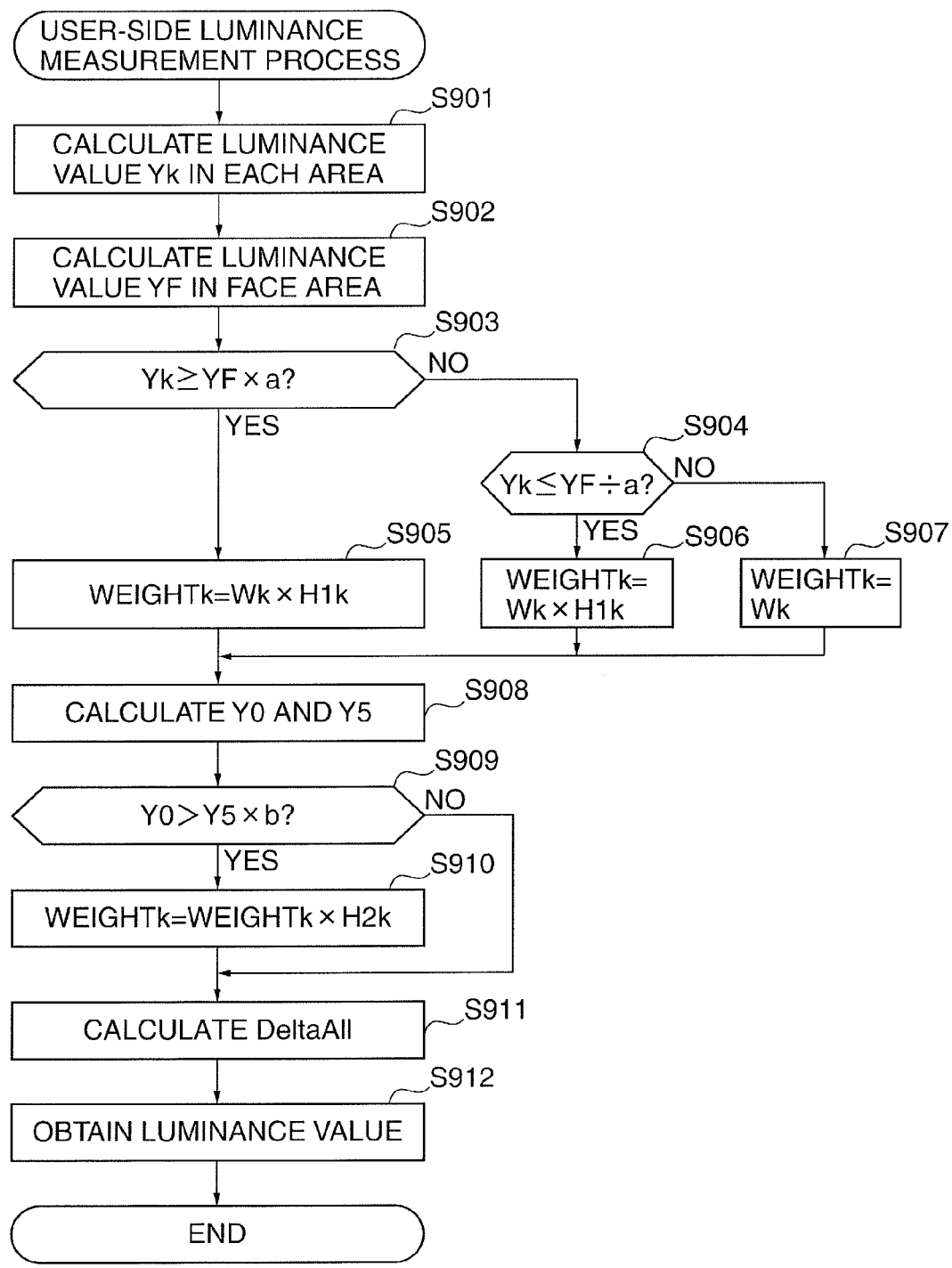
FIG. 10 is a flowchart showing the procedures of a user-side luminance measurement process that is performed in the step S403 in FIG. 4.

FIG. 10 is a flowchart showing the procedure of the user-side luminance measurement process that is performed in the step S403 in FIG. 4.

First, the CPU 15 obtains an average luminance value Yk (k=1 to 4) (step S901). Further, the CPU 15 obtains an average luminance value YF in a face area (step S902).

The CPU 15 then determines whether or not the luminance value in each area is equal to or greater than a value which is $\underline{a}$ times as large as the luminance value in the face area. Namely, the CPU 15 determines whether or not Yk≥YF×a holds (step S903). When Yk<YFc×a holds (NO to step S903), the CPU 15 determines whether or not the luminance value in each area is equal to or smaller than a value which is 1/a times as small as the luminance value in the central area. Namely, the CPU 15 determines whether or not Yk≤YF/a holds (step S904).

When Yk≥YF×a holds (YES to step S903), the CPU 15 multiplies a weighting coefficient Wk, which is determined in advance, by a predetermined correction coefficient H1k (third correction coefficient) to obtain a weighting coefficient WEIGHTk (third weighting coefficient) for use in obtaining an exposure control correction value. Namely, the CPU 15 determines that WEIGHTk=Wk×H1k holds (step S905).

When Yk≤YF/a holds (YES to step S904), the CPU 15 determines that WEIGHTk=Wk×H1k (step S906). On the other hand, when Yk>YF/a holds (NO to step S904), the CPU 15 sets the weighting coefficient WEIGHTk at the weighting coefficient Wk (step S907).

Figure 11:
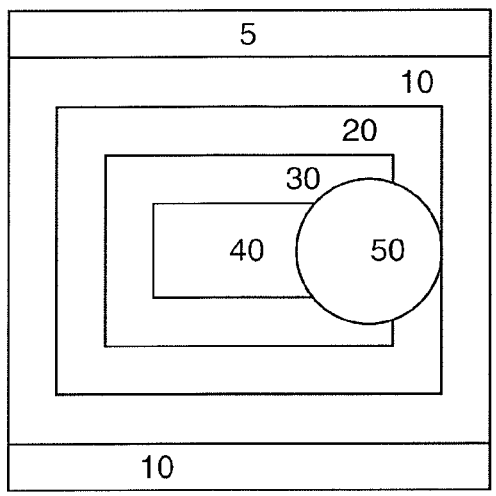
FIG. 11 is a diagram showing exemplary weighting coefficients Wk determined in advance and for use in setting a weighting coefficient WEIGHTk in step S905 in FIG. 10.

FIG. 11 is a diagram showing exemplary weighting coefficients Wk determined in advance and for use in setting the weighting coefficient WEIGHTk in the step S905 in FIG. 10.

Referring to FIG. 11, the weighting coefficient Wk is determined in advance with respect to each area of an image. In the example shown in the figure, the weighting coefficient Wk is the highest in a face area and decreases toward a surrounding area.

Figure 12:
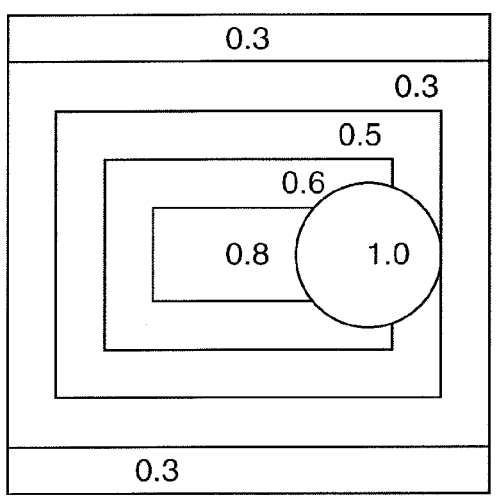
FIG. 12 is a view showing exemplary predetermined correction coefficients H1k for use in setting the weighting coefficient WEIGHTk in the step S905 in FIG. 10.

FIG. 12 is a view showing exemplary predetermined correction coefficients H1k for use in setting the weighting coefficient WEIGHTk in the step S905 in FIG. 10.

Referring to FIG. 12, as shown in the figure, the correction coefficient H1ij is high in a central area of the image and decreases toward a surrounding area.

Referring to FIG. 10 again, after carrying out the processes in the steps S905, S906, or S907, the CPU 15 obtains an average luminance value Y0 in an upper part (area "0") of the image and an average luminance value Y5 in a lower part (area "5") of the image using an equation (step S908).

The CPU 15 then judges whether or not the average luminance value Y0 is greater than a value which is b̲ times as large as the average luminance value Y5, that is, whether or not Y0>Y5×b holds (step S909). When Y0>Y5×b hodls (YES to step S909), the CPU 15 multiplies the weighting coefficient WEIGHTk by a predetermined correction coefficient H2k (fourth correction coefficient) to correct the weighting coefficient WEIGHTk and obtain a fourth weighting coefficient (step S910).

Figure 13:
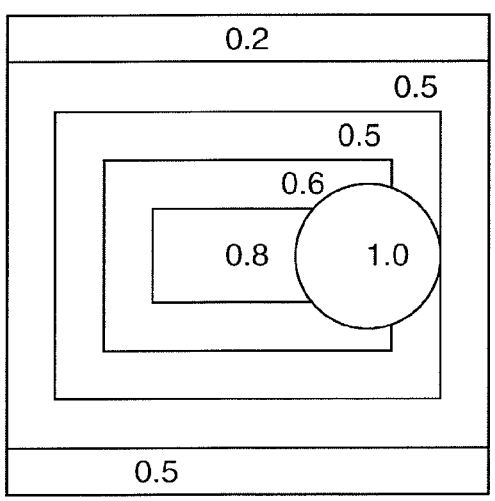
FIG. 13 is a view showing exemplary fourth correction coefficients for use in setting a fourth weighting coefficient in step S910 in FIG. 10.

FIG. 13 is a view showing exemplary fourth correction coefficients for use in setting the fourth weighting coefficient in the step S910 in FIG. 10.

Referring to FIG. 9, the fourth weighting coefficient (correction coefficient H2k) is the lowest in the uppermost part (area "0") and increases toward the central part. The fourth weighting coefficient takes on a value "1.0" in the face area "F".

The CPU 15 then calculates an exposure control correction value DeltaAll using an equation (5) below (step S911).

$$\text{DeltaAll} = \text{Log } 2(\Sigma(Yk \times \text{WEIGHT}k)/(\Sigma \text{WEIGHT}k)/Yref \quad (5)$$

where k is 0 to 5, and Yref is a target luminance of an image.

In the equation (5), both the third weighting coefficient and the fourth weighting coefficient are represented by WEIGHTk.

Thereafter, the CPU 15 calculates a user luminance according to the exposure control correction value DeltaAll, an aperture value employed when an image used to find the exposure control correction value DeltaAll is generated, integration time of the second sensor, and degree of signal amplification performed by the second image pickup circuit (step S912), followed by the program terminating.

When Y0≤Y5×b holds (NO to step S909), the program proceeds to the step S911, in which the CPU 15 obtains the exposure control correction value DeltaAll according to the above equation (5) using the third weighting coefficient without correcting the weighting coefficient WEIGHTk.

Carrying out a user-side luminance measurement in the above described manner enables the user luminance to be measured without being affected by a luminance of a background with emphasis placed on a face region.

It should be noted that during measurement of a user-side luminance, there may be produced a state called a face shadow in which a face of the user is shadowed by the camera 1 or the like. In this case, it is difficult to accurately measure a luminance of a face part of the user, and hence a face region is divided into a bright part and a dark part. The processes in the steps 901 to 911 described above are carried out using the bright part as a face region. Namely, the CPU 15 selects luminance values in a face region not less than a predetermined luminance value as first selected luminance values, obtains an average value of the first selected luminance values as a first average luminance value, and sets this value as an average luminance value YF in a face area.

When the distance between the camera 1 and the user is short, the photographer's face may be shadowed as described above. For this reason, according to a size of the photographer's face obtained as a result of AF performed using an output from the scan AF circuit 14 and face detection by the face detection circuit 36, the distance between the camera 1 and the user is estimated, and only when this distance is shorter than a predetermined distance (that is, equal to or shorter than the predetermined distance), the face region is limited to a bright part.

Referring again to FIG. 4, the CPU 14 compares the subject-side luminance value and the user-side luminance value with each other to judge whether or not the user-side luminance value is a predetermined value greater than the subject-side luminance value (step S404). When the user-side luminance value is the predetermined value greater than the subject-side luminance value (YES to step S404), the CPU 15 increments the backlight level aL (step S405). Here, when the subject is backlit, the user to which a light source illuminates to a greater degree as compared to the subject is brighter than the subject, the CPU 15 increments the backlight level aL and then measures the face-shadow region (step S406).

It should be noted that when the user-side luminance value is not the predetermined value greater than the subject-side luminance value (NO to step S404), the program proceeds to step S406, in which the CPU 15 measures the face region.

To measure the face region, the CPU 15 obtains an average luminance value in the face region of the image according to a result of face detection by the face detection circuit 36. By using this average luminance value as a threshold value, the CPU 15 then obtains the number of pixels (the number of bright pixels, that is, the number of first pixels) in the face region having a luminance value (first selected luminance value) not less than the threshold value (e.g. not less than the average luminance value, that is, not less than a predetermined luminance value) and the number of pixels (the number of dark pixels, that is, the number of second pixels) having in a face region having a luminance value (second selected luminance value) less than the threshold value (e.g. less than the average luminance value, that is, less than the predetermined luminance value).

The CPU 15 then obtains a ratio Rfx of the number of bright pixels to the number of dark pixels assuming a part brighter than the threshold value (that is, a part where there are bright pixels) as a face, and a dark part (that is, a part where there are dark pixels) as a face shadow.

The CPU 15 judges whether or not the ratio Rfs is less than a predetermined value (for example, 0.75) assuming that Rfs=the number of pixels less than the threshold value (the number of dark pixels)/the number of pixels not less than the threshold value (the number of bright pixels) (step S407). When the ratio Rfs is less than the predetermined value (YES to step S407), the CPU 15 increments the backlight level aL (step S408).

In an oblique light condition in the morning or late afternoon, half of a face may be shadowed when shooting in a direction perpendicular to the sun is attempted. Also, when the user himself/herself is backlit, his/her entire face is shadowed. That is, when a face shadow is small, there is a high possibility that the user is directly exposed to the light source, and the subject is backlit. Thus, by comparing the proportion of a face shadow with a predetermined value, a judgment result can be obtained by estimating whether or not the subject is backlit.

As described above, however, when the camera 1 and the user are close to each other, a shadow described above may be produced. Accordingly, here, the distance between the camera 1 and the user 1 is estimated, and when this distance is shorter than a predetermined distance, the process in the step S408 is not carried out.

The CPU 15 then obtains eye information on an eye of the user from the face detection result (step S409). When image data concerned with the user (second image data) is input to the face detection circuit 36, the face detection circuit 36 performs face detection except under extremely adverse conditions and identifies an eye region of the user in the face detection result.

It should be noted that when the ratio Rfs is not less than the predetermined value (NO to step S407), the process proceeds to the step S409, in which the CPU 15 obtains the eye information.

Next, the CPU 15 determines whether or not the user is narrowing his/her eye (step S410). Here, based on the eye information included in the face detection result, the CPU 15 judges whether the user is narrowing his/her eye. When a size of a part identified as the eye region based on the eye information is small, the user is dazzled. Thus, when the size of the eye region is smaller than a predetermined size, the CPU 15 judges that the user is narrowing his/her eye.

Upon judging that the user is narrowing his/her eye (YES to step S410), the CPU 15 increments the backlight level aL (step S411).

It should be noted that in order to realize the accuracy judge, the CPU 15 judges that the user is narrowing his/her eye when a size of the eye is smaller than a predetermined size continuously for a predetermined time period or longer. This prevents erroneous judgment resulting from involuntary blinking or the like.

The CPU 15 then estimates whether or not there is a light source at any position on the mage associated with the first image data (step S414). Here, assuming that a part of an upper part of the image which is brighter by over a predetermined value than the other parts in the image, the CPU 15 obtains center coordinates of the light source.

As described above, the image is divided into 64 blocks in total, 8 parts in upper, lower, right, and left. The average luminance value Yij is obtained with respect to each block. The CPU 15 searches for a block where the average luminance value Yij is the greatest, and when this block lies in two tiers in the upper part of the image, the CPU 15 estimates that the light source is in this block.

The CPU 15 checks the average luminance value Yij in a block adjacent to the block estimated to have the light source therein, and when a difference between the average luminance value Yij in the block estimated to have the light source therein and the average luminance value Yij in the adjacent block is less than a predetermined value, the CPU 15 judges that there is also a light source in the adjacent block as well.

Blocks in eight directions, i.e. obliquely upward and obliquely downward directions as well as upward, downward, rightward, and leftward directions are targeted as adjacent blocks. Upon determining that a light source is in a plurality of blocks, the CPU 15 obtains average coordinates of center coordinates of these blocks and regards the average coordinates as coordinates of the light source.

As described above, after obtaining the coordinates of the light source, the CPU 15 obtains angles of the light source with respect to the camera 1 in a horizontal direction and a vertical direction (first angular information) based on a focal length corresponding to a zoom position of the first taking lens barrel 31 set using the zoom switch. Because angles of four corners of the image can be known from the focal length of the first taking lens barrel 31, the angles of the light source with respect to the camera 1 in the horizontal direction and the vertical direction can be obtained based on the relationship with the position (coordinates) of the light source.

The CPU 15 then obtains the positional relationship among the light source, the camera (image pickup apparatus) 1, and the user (step S415). Here, according to the face information (face detection result) on the user, the CPU 15 obtains a position of the face (face center coordinates) in the face detection result, as is the case with the process in the step S414, and then obtains angles of the photographer's face with respect to the camera 1 in a horizontal direction and a vertical direction (second angular information) according to a focal length of the second taking lens barrel 50.

The CPU 15 then judges whether or not the light source, the camera 1, and the user are in substantially alignment with one another (step S416). When the above two angles are substantially equal, and directions are opposite, it can be considered that the light source, the camera 1, and the user are in substantially alignment with one another.

When the light source, the camera 1, and the user are in substantially alignment with one another (YES to step S416), the CPU 15 increments the backlight level aL (step S417).

The CPU 15 then sets a constant α, which is for use in comparing the average luminance value in each area and the average luminance value in the central part with each other, according to the backlight level al using an equation (6) (step S418). It should be noted that when the light source, the camera 1, and the user are not in substantially alignment with each other (NO to step S416), the program proceeds to step S418.

$$\alpha = a - 0.4 \times aL \quad (6)$$

Further, the CPU 15 sets a constant β, which is for use in comparing the average luminance value in the upper part of the image and the average luminance value in the lower part of the image with each other, according to the backlight level aL using an equation (7) (step S419).

$$\beta = b - 0.2 \times aL \quad (7)$$

The CPU 15 then sets a correction coefficient H3ij (backlight parameter) for a weighting coefficient with respect to each area according to the backlight level al using an equation (8) (step S420), followed by the program terminating.

$$H3ij = H1ij^{(aL+1)} \quad (8)$$

Referring again to FIG. 3, when the setting of the backlight parameters is completed, the CPU 15 obtains an exposure value, which is for use in shooting, by carrying out an exposure value calculation process of FIG. 14, to be described later (step S302).

Figure 14:
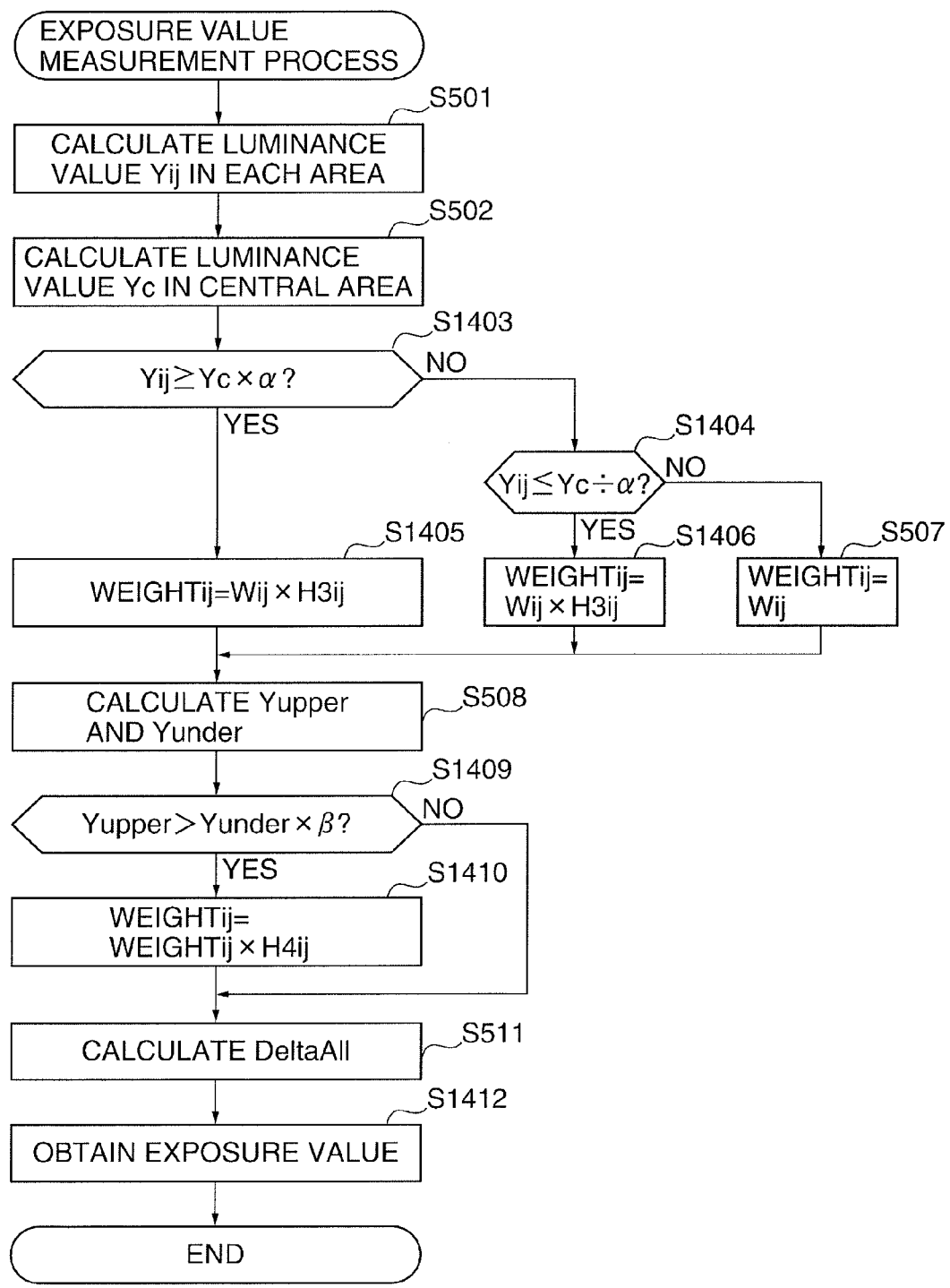
FIG. 14 is a flowchart showing the procedure of an exposure value calculation process that is performed in step S302 in FIG. 3.

FIG. 14 is a flowchart showing the procedure of the exposure value calculation process that is performed in the step S302 in FIG. 3.

In FIG. 14, the same steps as those in the flowchart of FIG. 5 are designated by the same reference symbols, and description thereof is omitted.

After obtaining the average luminance value Yc in the central part in the step S502, the CPU 15 determines whether or not the average luminance value Yij is $\alpha$ times as large as the luminance value Yc. When Yij<Yc×α holds (NO to step S1403), the CPU 15 judges whether or not the luminance value in each area is 1/α times as small as the luminance value in the central area. Namely, the CPU 15 determines whether or not Yij≤Yc/a holds (step S1404).

When Yij≥Yc×a holds (YES to step S1403), the CPU 15 multiplies a weighting coefficient Wij, which is determined in advance, by a predetermined correction coefficient H3ij (backlight parameter) to obtain a weighting coefficient WEIGHTij for use in obtaining an exposure control correction value. Namely, the CPU 15 determines that WEIGHTij=Wij×H3ij holds (step S1405).

When Yij≤Yc/a holds (YES to step S1404), the CPU 15 determines that WEIGHTij=Wij×H3ij holds (step S1406). On the other hand, when Yij>Yc/a holds (NO to step S1404), the program proceeds to the step S507, in which the CPU 15 sets the weighting coefficient WEIGHTij at the weighting coefficient Wij.

The CPU 15 then determines the average luminance value Yupper and the average luminance value Yunder in step S508, and determines whether or not the average luminance value Yupper is greater than a value that is β times as large as the average luminance value Yunder (step S1409). When Yupper>Yunder×β holds (YES to step S1409), the CPU 15 multiplies the weighting coefficient WEIGHTij by a predetermined correction coefficient H4ij (fifth correction coefficient) to correct the weighting coefficient WEIGHTij and obtain a fifth weighting coefficient (step S1410).

The CPU 15 then calculates an exposure control correction value DeltaAll in the step S511. Further, the CPU 15 calculates an exposure value for use in shooting according to the exposure control correction value DeltaAll, an aperture value when an image used to find the exposure control correction value DeltaAll is generated, integration time of the first sensor, and degree of signal amplification performed by the first image pickup circuit (step S1412), followed by the program terminating.

When Yupper≤Yunder×β holds (NO to step S1409), the program proceeds to the step S511, in which the CPU 15 obtains the exposure control correction value DeltaAll without correcting the weighting coefficient WEIGHTij.

By performing calculations in the above described manner, an exposure value for use in shooting can be obtained without being affected by a luminance of a background with emphasis placed on a central part.

Referring to FIG. 3 again, after calculating the exposure value for use in shooting, the CPU 15 obtains an aperture value (Av value), a shutter speed (Tv value), and a sensor sensitivity (Sv value) for use in shooting (step S303). According to a zoom position set by the user, the CPU 15 sets the Tv value such that a camera shake will not occur. Further the CPU 15 sets the Av value such that the exposure value obtained in the step S302 is reached here the Sv value is within a range from SO 100 to 400.

Then, according to the Tv value and the Av value, the CUP 15 determines the Sv value. When the Av value falls outside a setting range, the CPU 15 adjusts the Tv value without changing the Av value and the Sv value.

For example, when setting of a minimum aperture and a minimum sensitivity is impossible due to a bright condition, the CPU 15 adjusts the Tv value to a higher-speed side. In a dark condition, the CPU 15 keeps the Av value as small as about ISO 400 and changes the TV value to a lower-speed side. Even after that, the CPU 15 sets the Sv value at a value greater than ISO 400 so that sensitivity can be high.

When sensitivity is too high, noise is conspicuous in an image. When the TV value is small, an image degrades due to a camera shake or a subject shake. When the Av value is small, the depth of field is shallow, and the entire subject may not be focused on when the subject is deep.

On the other hand, increasing the Av value may cause degradation of the image due to a diffraction phenomenon. Therefore, with consideration given to the balance among the Sv value, the Tv value, and the Av value, the CPU 15 sets the Sv value, the Tv value, and the Av value so that the exposure value obtained in the step S302 can be reached.

However, when any one of the Sv value, the Tv value, and the Av value is determined by the user according to a TV priority mode, an AV priority mode, or ISO fixed, the CPU 15 sets only the other two values. when two of the Sv value, the Tv value, and the Av value are determined by the user, the CPU 15 sets the other one value.

It should noted that as various types of this setting method have already been proposed, and the above setting method is only one example There are an upper limit and a lower limit to each of the Sv value, the Tv value, and the Av value in terms of performance of the camera 1 and in terms of control.

The CPU 15 then sets a flash firing judgment parameter in backlight (step S304). Here, the CPU 15 sets a threshold value FlashOnTh which is a luminance difference when the flash is fired. The CPU 15 sets the threshold value FlashOnTh using an equation (9) below according to the backlight level aL obtained in the step S301. It should be noted that a unit is the number of exposure stages.

$$FlashOnTh = FlashOnTh0 - 0.25 \times aL \quad (9)$$

where FlashOnTh0 is an initial value.

The CPU 15 then obtains distance information Dist indicative of a distance between the camera 1 and the subject according to the AF result (that is, the AF evaluation value (step S305). The CPU 15 then obtains a difference DeltaCenter between an exposure value in the central part and the exposure value obtained in the step S302 (step S306). Here, the exposure in the central part is an average value AveYij of luminance values Yij in central blocks of the image divided into 64 parts (for example, central eight blocks in FIG. 7 for which the correction coefficient is 1.0). The difference DeltaCenter is obtained using an equation (10) below.

$$DeltaCenter = Log 2(AveYij/Yref) \quad (10)$$

where Yref is a target luminance of an image.

The CPU 15 then determines whether or not DeltaCenter<0 holds (step S307). When DeltaCenter<0 holds (YES to step S307), the CPU 15 calculates (DeltaAll−DeltaCenter), and determines whether or not the calculated difference is equal to or more than the threshold value FlashOnTh (step S308).

When the above difference is equal to or more than the threshold value FlashOnTh (YES to step S308), the CPU 15 determines whether or not the distance represented by the distance information Dist obtained in the step S305 is shorter than a hyperfocal distance (step S309). The hyperfocal distance means a distance on a near side which lies inside a depth of field when infinity is focused on.

When Dist<hyperfocal distance holds (YES to step S309), the CPU 15 makes such a setting as to fire the flash in shooting (step S310), followed by the program terminating.

On the other hand, when Dist≥hyperfocal distance holds (NO to step S309), the CPU 15 makes such a setting as not to fire the flash because strobe light does not reach the subject (step S311), followed by the program terminating.

When (DeltaAll-DeltaCenter)-FlashOnTh holds (NO to step S308), the CPU 15 judges that the central part will not be extremely underexposed even when the flash is not fired because an appropriate exposure value in the central part is greater than an exposure value in shooting or a difference therebetween is small, and hence the central part is brighter than the entire image, followed by the program proceeding to the step S311.

When the difference DeltaCenter is equal to or greater than zero (NO to step S307), that is, when the central part is brighter than the entire image, the CPU 15 judges that it is unnecessary to fire the flash, followed by the program proceeding to the step S311.

It should be noted that here, the judgment as to whether to fire the flash has been described in relation to the backlight judgment, but whether or not to fire the flash at low illumination is judged using another method according to a measured illumination of a subject. This method is not directly related to the present invention, and therefore, description thereof is omitted.

Thus, according to the first embodiment of the present invention, because an image obtained using the second taking lens barrel aimed at the user as an object of shooting is used to control exposure in a backlight scene and correct for an error in exposure calculation caused by a background such as the sky, not only the backlight judgment can be made with accuracy, but also the influence of the background can be eliminated, so that a main subject can be shot with correct exposure.

It should be noted that although in the embodiment described above, an image obtained using the second taking lens barrel aiming at the user as an object of shooting is used to make various judgments and adjust the backlight level, all the judgments should not necessarily be made. Although a more accurate backlight judgment can be made by making all the determinations in the steps S404, S407, S410, and S416 and adjusting the backlight level, a more accurate backlight judgment than ever before can be made merely by making at least one of the determinations in the steps S404, S407, S10, and S416.

A description will now be given of an image pickup apparatus having an exposure control apparatus according to a second embodiment of the present invention. An arrangement of the image pickup apparatus according to the present embodiment is the same as that of the camera in FIG. 1. A shooting process carried out by the image pickup apparatus according to the present embodiment is the same as the process described above with reference to FIGS. 2 to 5, and 14, but different from the camera in FIG. 1 in that a user-side luminance measurement process thereof (FIG. 15) differs from that in FIG. 10.

Figure 15:
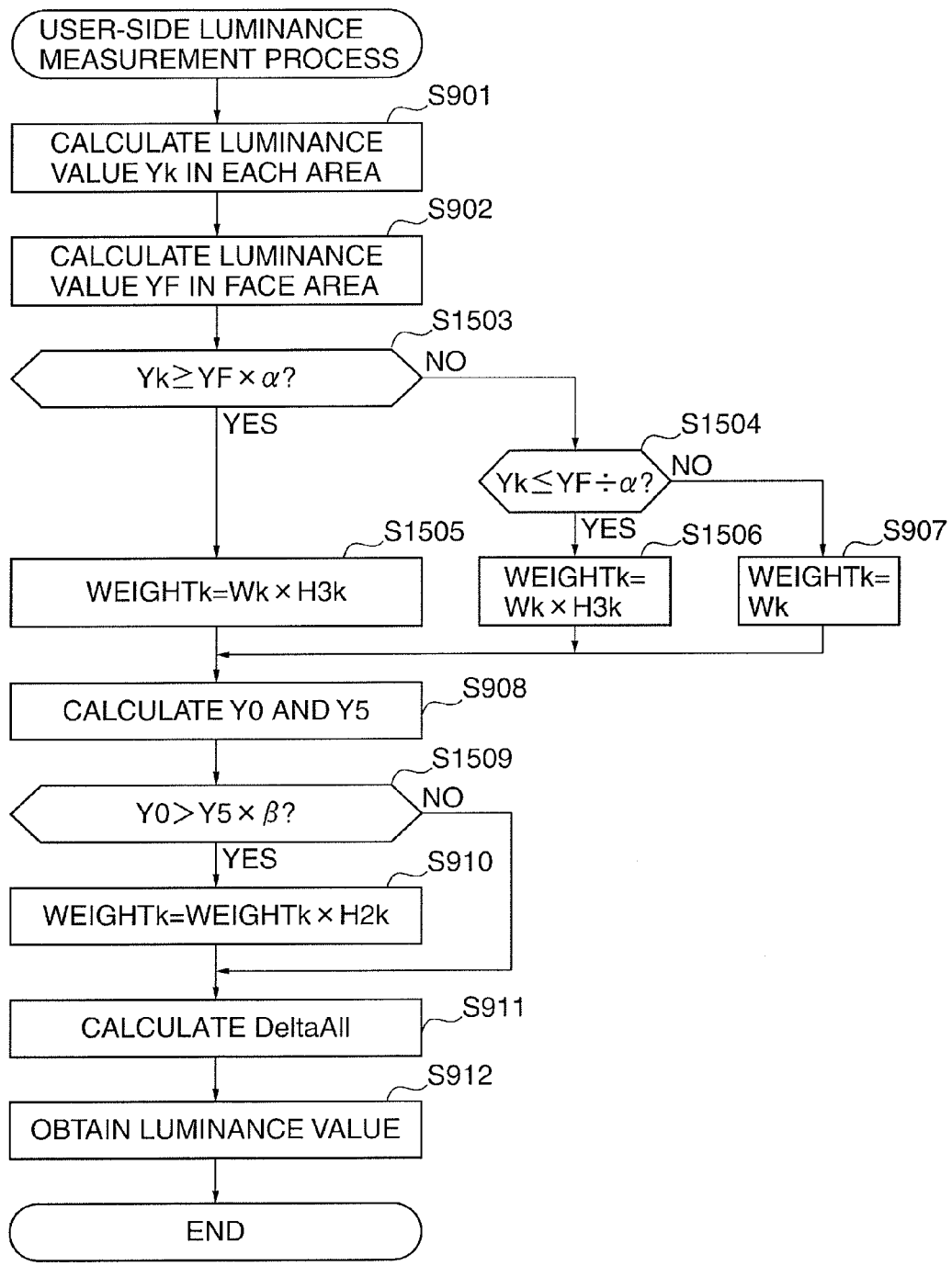
FIG. 15 is a flowchart showing the procedures of a user-side brightness measurement process that is performed in the step S403 in FIG. 4 by an image pickup apparatus having an exposure control apparatus according to a second embodiment of the present invention.

FIG. 15 is a flowchart showing the procedure of the user-side brightness measurement process performed in the step S403 in FIG. 4 by the image pickup apparatus having the exposure control apparatus according to the second embodiment of the present invention.

In the flowchart of FIG. 15, the same steps as those in the flowchart of FIG. 10 are designated by the same reference symbols, and description thereof is omitted.

In the example shown in FIG. 15, an exposure value is calculated according to second imaged data (user image). It is assumed that the user image is divided in the way described with reference to FIG. 9.

First, the CPU 15 carries out the processes in the steps S901 and S902 to obtain the average luminance value Yk and obtain the average luminance value YF in the face area.

The CPU 15 then determines whether or not the luminance value in each area is equal to or greater than a value which is $\alpha$ times as large as the luminance value YF in the face area (step S1503).

When Yk<YF×a holds (NO to step S1503), the CPU 15 determines whether or not the luminance value Yk in each area is equal to or smaller than a value that is $1/\alpha$ times as small as the luminance value YF in the face area (step S1504).

When Yk≥YF×$\alpha$ holds (YES to step S1503), the CPU 15 multiplies the weighting coefficient Wk, which is determined in advance, by a predetermined correction coefficient H3k (sixth correction coefficient) to obtain the weighting coefficient WEIGHTk for use in obtaining an exposure control correction value. Namely, the CPU 15 sets as WEIGHTk=Wk×H3k (step S1505).

When Yk≤YF/$\alpha$ holds (YES to step S1504), the CPU 15 sets as WEIGHTk=Wk×H3k (step S1506). On the other hand, when Yk>YF/a holds (NO to step S1504), the program proceeds to the step S907, in which the CPU 15 sets as the weighting coefficient WEIGHTk=the weighting coefficient Wk.

After the processes in the steps S905, S906, or S907, the program proceeds to the step S908, in which the CPU 15 obtains the average luminance value Y0 and the average luminance value Y5 described above. The CPU 15 then determines whether or not the average luminance value Y0 is greater than a value which is $\beta$ times as large as the average luminance value Y5, that is, whether or not Y0>Y5×$\beta$ holds (step S1509).

When Y0>Y5×$\beta$ holds (YES to step S1509), the CPU 15 multiplies the weighting coefficient WEIGHTk by the predetermined correction coefficient H2k to correct the weighting coefficient WEIGHTk and obtain the fourth weighting coefficient (step S910) and calculates the exposure control correction value DeltaAll using the equation (5) described above (step S911).

Thereafter, the CPU 15 calculates a user luminance value according to the calculated exposure control correction value DeltaAll, an aperture value when an image used to find the exposure control correction value DeltaAll is generated, integration time of the second sensor, and degree of signal amplification performed by the second image pickup circuit (step S912), followed by the program terminating.

When Y0≤Y5×$\beta$ holds (NO to step S1509), the CPU 15 obtains the exposure control correction value DeltaAll according to the equation (5) using the third weighting coefficient without correcting the weighting coefficient WEIGHTk.

Thus, according to the second embodiment as well, because an image obtained using the second taking lens barrel aimed at the user as an object of shooting is used to control exposure in a backlight scene and correct for an error in exposure calculation caused by a background such as the sky, not only a backlight judgment can be made with accuracy, but also the influence of the background can be eliminated, so that a main subject can be shot with correct exposure.

As described above, according to the embodiments of the present invention, whether or not a main subject is backlit can be determined with accuracy even in a scene an erroneous backlight judgment tends to be made, for example, in a case where the main subject has low reflectivity or a case where a background is bright, and according to the judgment result, exposure can be controlled with accuracy.

Although in the above description of the embodiment of the present invention, the digital camera is taken as an example of the image pickup apparatus, the present invention may be applied to a digital video camera, a digital single-lens reflex camera, a cellular phone with a camera, and so on. A CMOS sensor, a CCD, or the like is used as the image pickup device.

As is apparent from the above description, in the example shown in FIG. 1, at least the AE processing circuit 13, the scan AF processing circuit, the CPU 15, and the face detection circuit 36 constitute the exposure control apparatus. The AE processing circuit 13 and the CPU 15 act as a first photometric measurement means, and a second photometric measurement means.

Further, the CPU 15 acts as a judgment means, and the CPU 15, the first motor drive circuit 18, and the first motor 21 act as an exposure control means. The CPU 15 and the face detection circuit 36 act as a detection means. In addition, the CPU 15 acts as a first average luminance calculation means or a first number-of-pixels calculation means and a second number-of-pixels calculation means. The CPU 15 acts as an estimation means and a position obtainment means.

Further, the first taking lens barrel 31 and the second taking lens barrel 50 act as a first shooting optical system and a second shooting optical system, respectively, and the first sensor 5, the first image pickup circuit 6, and the first A/D conversion circuit 7 act as a first image pickup means. The second sensor 5, the second image pickup circuit 6, and the second A/D conversion circuit 7 act as a second image pickup means.

The CPU 15 acts as a first angle calculation means and a second angle calculation means, and the CPU 15, the VRAM 8, and the D/A conversion circuit 9 act as a display control means. Moreover, the CPU 15 and the synthesis circuit 48 act as a synthesis means.

Although the present invention has been described based on the embodiments, the present invention is not limited to them, but encompasses various forms without departing from the scope of the invention.

For example, the functions of the embodiments described above are used as a control method, and this control method may be implemented by the exposure control apparatus. Moreover, a program having the functions of the embodiments described above is used as a control program, and this control program may be executed by a computer which the exposure control apparatus has. It should be noted that the control program is recorded in, for example, a computer-readable recording medium.

Each of the control method and the control program have at least a first photometric measurement step, a second photometric measurement step, a judgment step, and an exposure control step.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159384 filed Jul. 31, 2013, which is hereby incorporated by reference herein in its entirety.

What is claimed is:

1. An exposure control apparatus of an image pickup apparatus having a first image pickup unit configured to generate first image data according to a main subject image formed by light from a main subject via a first shooting optical system, and a second image pickup unit configured to generate second image data according to a photographer image formed by light from a photographer via a second shooting optical system, comprising:
 a first photometric measurement unit configured to obtain first luminance information based on the first image data;
 a second photometric measurement unit configured to obtain second luminance information based on the second image data;
 a judgment unit configured to judge, according to the first luminance information and the second luminance information, whether or not the main subject is in backlight scene; and
 an exposure control unit configured to control, based on a result of the judgment by said judgment unit, exposure for the main subject.

2. The exposure control apparatus according to claim 1, further comprising a detection unit configured to detect a face region based on the second image data, and
 wherein said second photometric measurement unit obtains the second luminance information by measuring a luminance of the face region.

3. The exposure control apparatus according to claim 2, further comprising a first average luminance calculation unit configured to select, as first selected luminance values, luminance values not less than a predetermined luminance value from among luminance values represented by the second luminance information, and obtain an average value of the first selected luminance values as a first average luminance value.

4. The exposure control apparatus according to claim 3, wherein said judgment unit judges, when a distance between the first shooting optical system receiving light from the main subject and the photographer is within a predetermined distance, whether or not the main subject is in backlight scene according to the first luminance information and the first average luminance value.

5. The exposure control apparatus according to claim 1, further comprising a display control unit configured to display image data, which is obtained based on light from a first distance, as images on a display unit.

* * * * *